Oct. 28, 1941.  E. C. LEACH ET AL  2,260,947
SELF-LOADING VEHICLE
Filed Sept. 7, 1939  4 Sheets-Sheet 1

INVENTORS.
Elbert C. Leach,
Herbert J. Hillborn,
BY Cromwell, Greist & Warden,
ATTORNEYS.

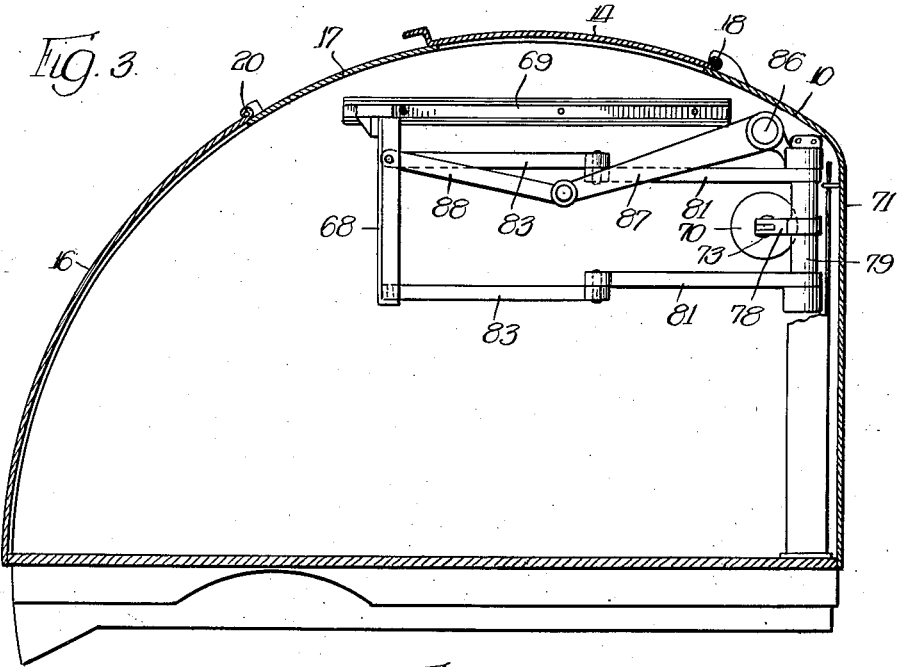

INVENTORS.
Elbert C. Leach,
Herbert J. Hillborn,
BY Cromwell, Greist & Warden.
ATTORNEYS.

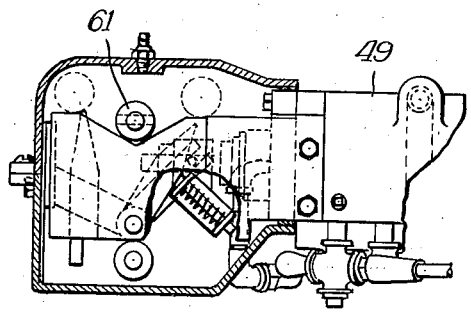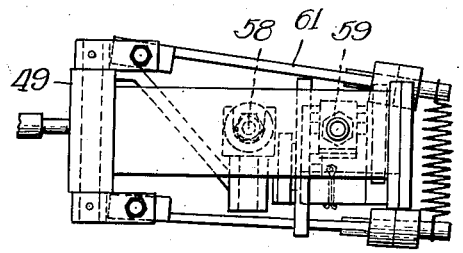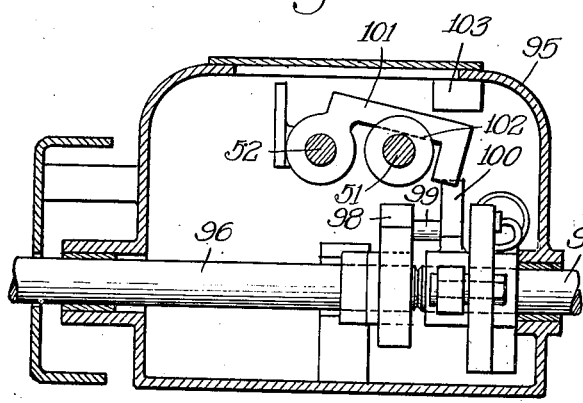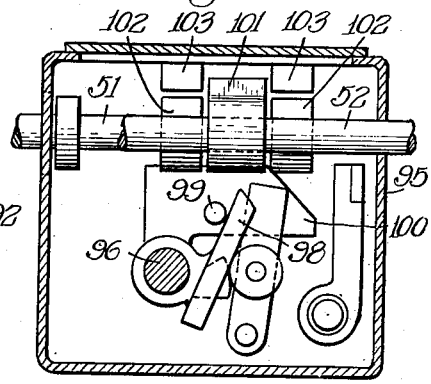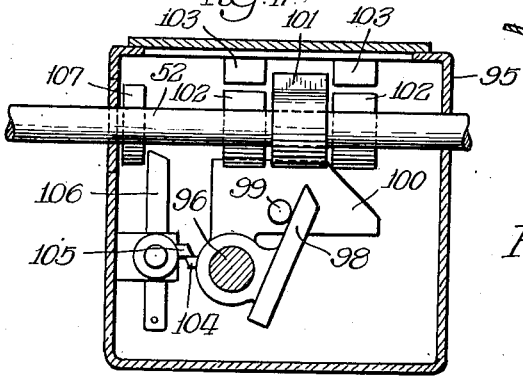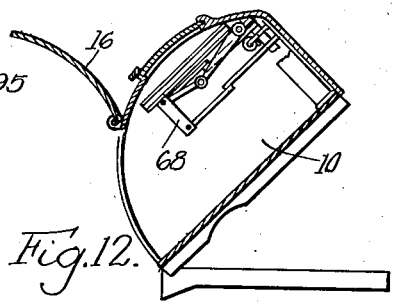

Patented Oct. 28, 1941

2,260,947

UNITED STATES PATENT OFFICE 2,260,947

SELF-LOADING VEHICLE

Elbert C. Leach and Herbert J. Hillborn, Oshkosh, Wis., assignors of one-half to Leach Company, Oshkosh, Wis., a corporation of Wisconsin, and one-half to The Elgin Corporation, Chicago, Ill., a corporation of New York Application September 7, 1939, Serial No. 293,806

5 Claims. (Cl. 214—67)

The present invention has to do with self-loading vehicles of the type disclosed in United States Patent No. 2,087,348.

One of the objects of this invention is to provide, in a self-loading vehicle of the type referred to, improved means for compacting the garbage, rubbish, or other material being loaded into the body of the vehicle, which compacting means can also be employed to expel the material from the body when the latter is in its tilted dumping position.

Another object of the invention is to provide, in such a vehicle, improved hydraulically operated means for raising and lowering the loading bucket, tilting the body, and working the compactor.

Still other more specific objects and advantages of the invention will be evident upon a full understanding of the compactor and the manner in which it is operated.

One embodiment of the invention is presented herein for the purpose of exemplification, but it will of course be appreciated that the invention is capable of being embodied in other structurally modified forms, for use with various kinds of self-loading vehicles, without departing from the spirit of the invention as defined in the appended claims.

In the accompanying drawings

Fig. 3 is a similar view, showing the pressure plate in its extended position;

Fig. 4 is a similar view, showing in plan the pressure plate in its extended position;

Fig. 7 is a side view of the valve reversing mechanism at the left end of the main control valve;

Fig. 8 is an end view of the reversing mechanism;

Fig. 9 is an interior view of the housing for the control mechanism associated with the operating lever of the diverting valve, showing the device employed for locking the operating lever of the main control valve in its neutral position;

Fig. 10 is another interior view, within the same housing, taken at right angles to Fig. 9;

Fig. 11 is still another interior view, within the same housing, likewise taken at right angles to Fig. 9, and Fig. 12 is a small view which is similar to Fig. 3 but shows the body in its dumping position, with the rear door open and the pressure plate in its rearmost position.

Figure 1:
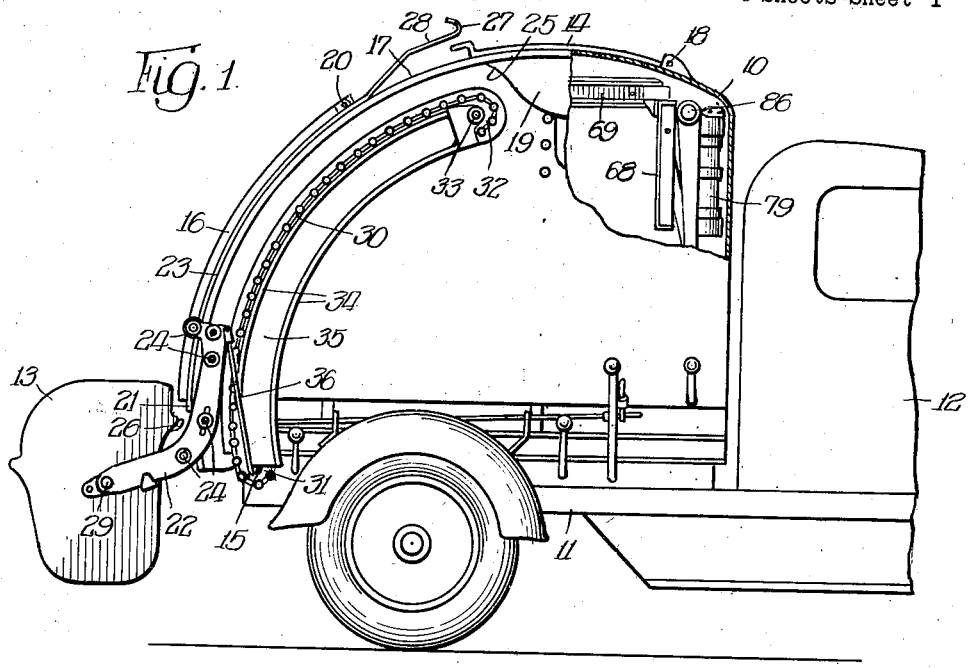
Fig. 1 is a side view of a self-loading vehicle equipped with a compactor constructed and operated in accordance with the invention, with a portion of one of the side walls of the body broken away to expose the compactor.

The self-loading vehicle shown in the drawings includes a large tank-like body 10 which is mounted on the chassis 11 of a motor truck 12. The garbage, rubbish or other material to be collected is emptied from individual containers into a trough-like bucket 13, which is positioned close to the ground at the rear end of the body. After the bucket 13 has been filled it is elevated to the top of the body 10 and dumped into the latter through an opening which is normally closed by a door 14. After the body 10 has been loaded to capacity in this way the vehicle is driven to any suitable point of disposal, where the body is tilted rearwardly on the chassis 11, about the axis of a shaft 15 to which the body is pivotally attached, and the contents discharged through a rear opening which is normally closed by a door 16.

The body 10 is completely enclosed. The front and side walls of the body extend straight up and down, while the top and rear walls are curved and are merged together in a single arcuate surface 17. The loading door 14 is hinged to the body at 18 and is provided at its side edges with downwardly extending plates 19, which plates fit against the sides of the body when the door is shut and serve to close off the otherwise exposed gaps at the sides of the door when the latter is open. The discharging door 16 at the rear end of the body is hinged to the body at 20 and is normally held shut and tightly sealed by a latching device located at 21.

The bucket 13 is pivotally supported at its ends on arms 22 which are adapted to travel along curved guide rails 23 on anti-friction rollers 24 journaled on the arms. The rails 23 are located on the curved edges of the sides of the body and project laterally somewhat beyond the same, being slotted at the sides of the door 14 to receive the closure plates 19. As the bucket 13 approaches the door 14, the foremost rollers 24 on the arms 22 engage with curved edges 25 on the plates 19 and cam the door upwardly into its open position. Just before the bucket 13 reaches the location of the door 14 loops 26 on the bucket engage with hooks 27 on the ends of downwardly yielding spring fingers 28 attached to the body, causing the bucket as it continues its upward movement to rotate on its trunnions 29 into an inverted position in register with the opening in the top of the body exposed by the raised door 14, thereby allowing the bucket to dump its contents into the body, with the lip of the bucket projecting down through the opening, and with the ends of the bucket shielded by the overlapping plates 19 on the door.

The bucket 13 is raised and lowered by means of endless chains 30 which are trained over sprockets 31 and 32 at opposite sides of the body. The lower sprockets 31 are secured to the shaft 15 on which the body is hinged, while the upper sprockets 32 are merely idlers and are secured to stub shafts 33 which are journaled in the sides of the body. The chains 30 are caused to travel in arcuate paths concentric with the rails 23 by suitable guides 34, and are enclosed for the most part within guides 35. The chains 30—which move in one direction when the bucket is being raised and move in the opposite direction when the bucket is being lowered—are connected with the arms 22 on the bucket by rigid coupling links 36.

The construction thus far described is substantially the same as that disclosed in Patent No. 2,087,348.

The bucket 13 is raised and lowered by means of a hydraulic cylinder 37 which is mounted on the chassis 11 of the vehicle beneath the body 10, and the body 10 is raised and lowered by means of the same hydraulic cylinder. The cylinder 37 is attached at its inner end or bottom to the chassis 11 by a pivot pin 38, which pin permits the outer end or top of the cylinder to move upwardly in raising the body 10. The cylinder 37 contains a piston 39 which is secured to a rod 40, and the rod 40 is pivotally connected to one end of an elongated downwardly facing gear rack 41. The rack 41 is slidably mounted in suitable guides on the under side of the body 10 and meshes downwardly with a pinion 42. This pinion is connected by a chain 43 and sprockets 44 and 45 with the bucket operating shaft 15 to which the rear end of the body is pivotally mounted.

The oil which is used in operating the cylinder 37 passes through two pipes 46 and 47, which are connected respectively with the top and bottom of the cylinder. The oil—which is placed under a pressure of about 1000 pounds by a pump (not shown) of any suitable description—is fed through one of these pipes into the cylinder 37 and is returned from the cylinder through the other pipe to a reservoir 48. When the oil is fed to the top of the cylinder the rack 41 will slide forwardly, causing the bucket to be elevated from its loading position to its dumping position, and when the direction of the flow of the oil is reversed the rack will slide rearwardly, causing the bucket to be returned to its loading position.

Figure 5:
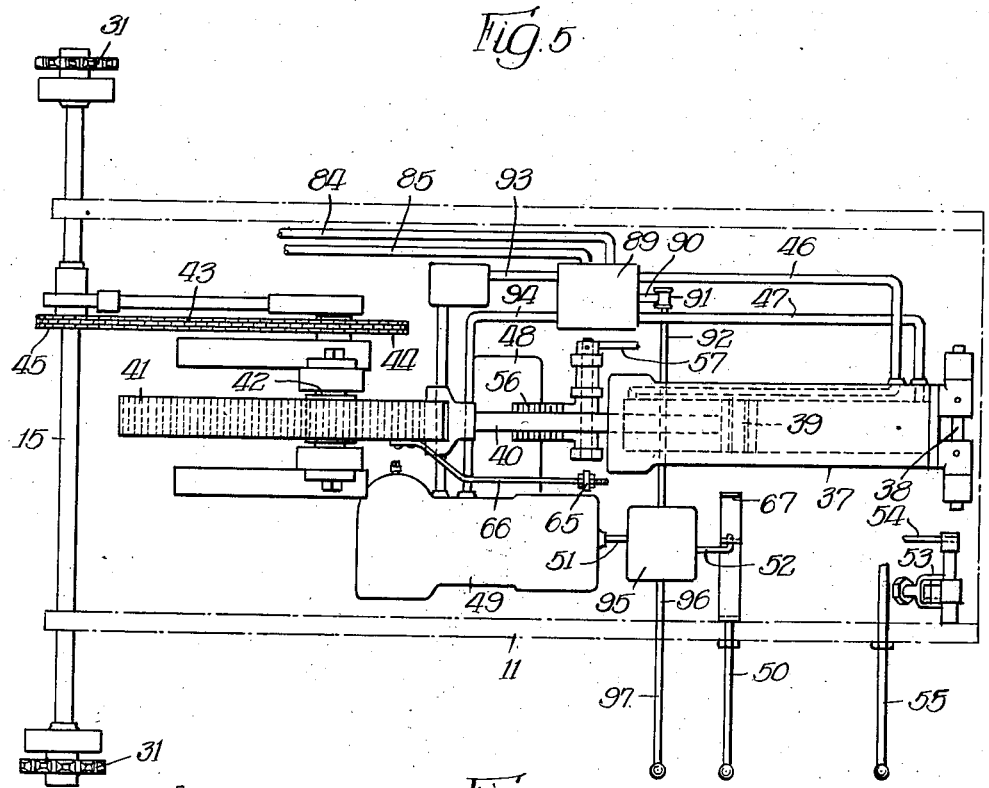
Fig. 5 is a plan view of the operating and control mechanisms located beneath the body.
Figure 6:
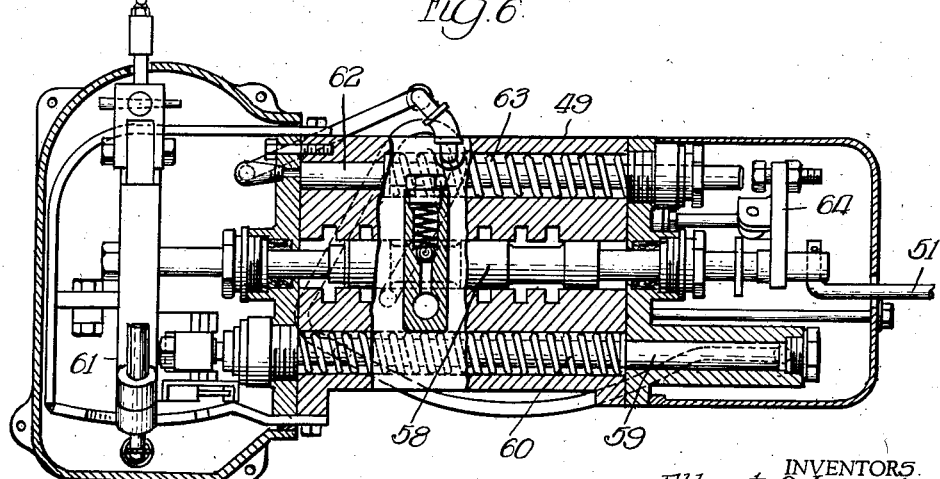
Fig. 6 is a horizontal sectional view through the main control valve.

The direction of flow of the oil through the pipes 46 and 47 is determined by the position of a main control valve 49, which valve is operated manually from a hand lever 50 through two normally coupled rod sections 51 and 52. When the hand lever 50 is moved to the left (as viewed in Fig. 5) from its neutral position, the control valve 49 will act to connect the pipe 46 with the pressure line and the pipe 47 with the discharge line, causing the bucket to raise. When the hand lever 50 is moved to the right, the control valve 49 will act to connect the pipe 47 with the pressure line and the pipe 46 with the discharge line, causing the bucket to descend.

When the body 10 is in its lowered position, as distinguished from its upwardly tilted dumping position, the body is fastened down securely to the chassis 11 by means of a readily releasable latching device 53. The device 53 is moved to and from its latching position by a rod 54 which is connected with a hand lever 55 at one side of the vehicle.

To tilt up the body 10 into its dumping position, the bucket 13 is first run up to the top of the body. When the bucket gets to the top it is kept there by moving the hand lever 50 back into its neutral position. This leaves the rack 41 at the extreme end of its forward movement. The latching device 53 is then operated by the hand lever 55 to unlock the body from the chassis, and a pivotally mounted pawl-like rack section 56 is swung upwardly by a rod 57, also preferably under the control of the hand lever 55, into meshed engagement with the under side of the front end of the rack 41, thereby anchoring the rack rigidly against movement relative to the body. After this has been done the hand lever 50 is moved from its neutral position to the right, causing the oil to flow into the bottom of the cylinder 37, and forcing the piston 39 and piston rod 40 rearwardly. As the rack 41 is incapable of moving relative to the body the latter will tilt up about the axis of the shaft 15 into its dumping position. To lower the body again the hand lever 50 is moved from its neutral position to the left.

The main control valve 49 contains a multiple-port center plunger 58 which is connected with the rod section 51. When the plunger 58 is shifted from its neutral position to the left the ports in the valve will direct the oil under pressure through the pipe 46 to the top of the cylinder 37 and will direct the oil returning from the cylinder through the pipe 47 to the reservoir, causing the bucket 13 to raise, or else causing the body 10 to lower, depending on the position of the hand lever 55.

When the piston 39 in the cylinder 37 reaches the end of its travel, the excess pressure built up in the pipe 46 by the stopping of the piston will act against one end of a side plunger 59 in the valve 49 and will move the plunger 59 to the left against the resistance of a spring 60. This movement of the plunger 59 will act through a reversing device 61 at one end of the valve to shift the center plunger 58 back through its neutral position to its extreme right position, in which latter position of the plunger the direction of the flow of oil through the pipes 46 and 47 will be reversed, causing the bucket first to stop and then descend. When the piston 39 in the cylinder 37 reaches the other end of its travel, the excess pressure built up in the pipe 47 by the stopping of the piston will act against one end of a second side plunger 62 in the valve 49 and will move the plunger 62 to the right against the resistance of a spring 63. This movement of the plunger 62 will act through a knock-out device 64 at the other end of the valve to shift the center plunger 58 back into its neutral position, in which position the flow of oil to and from the cylinder 37 will be shut off.

When the body 10 is being lowered, after having been tilted up, the valve 49 will be shifted back into its neutral position by the movement of a block 65, carried by a projection 66 on the rack 41, into engagement with an upwardly extending arm 67 associated with the hand lever 50.

Figure 2:
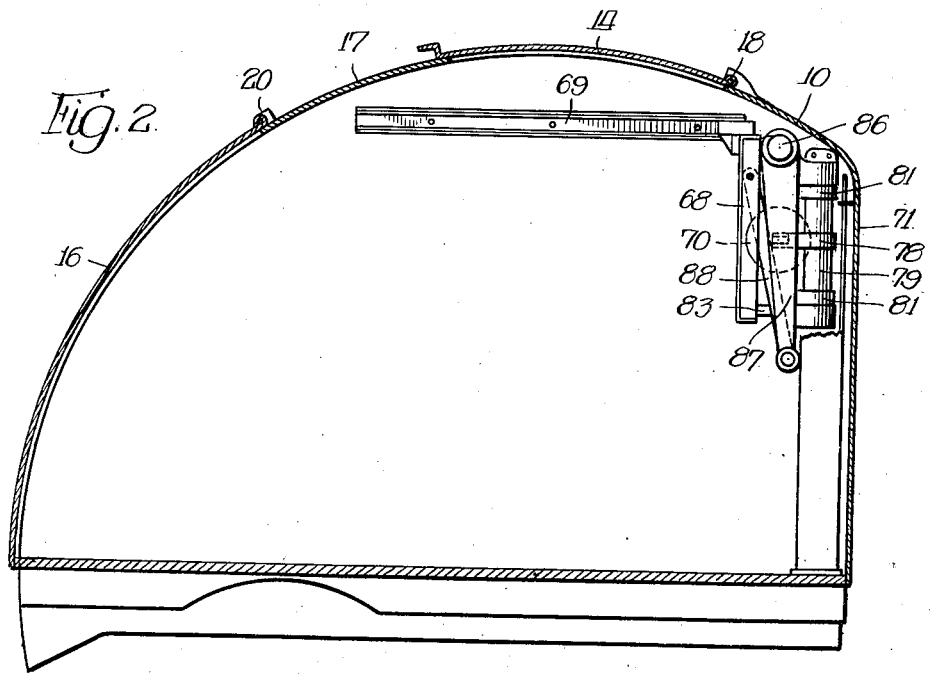
Fig. 2 is an interior view of the body, showing in side elevation the pressure plate of the compactor in its retracted position.

The compactor consists of a rectangular pressure plate 68 which is slidably mounted in the body 10 on horizontal guide rails 69 secured to the sides of the body. The plate 68 is arranged crosswise of the body in a vertical plane, and is adapted to move back and forth beneath the opening covered by the door 14, from the forwardly retracted position shown in Fig. 2 to the rearwardly projected position shown in Fig. 3. The plate 68 is moved by a horizontally disposed hydraulic cylinder 70 which occupies a position between the plate 68 and the front end 71 of the body when the plate is in its retracted position. The cylinder 70 contains a piston 72 and a piston rod 73. The lower end or bottom of the cylinder 70 is pivoted at 74 to a short arm 75 on a vertically disposed torque rod 76 in one corner of the body, and the outer end of the piston rod 73 is pivotally connected at 77 to a similar arm 78 on a torque rod 79 in the opposite corner of the body. The torque rods 76 and 79 carry vertically spaced pairs of longer arms 80 and 81 which are connected at their outer ends to the sides of the pressure plate 68 by pairs of links 82 and 83. Pipes 84 and 85 are connected with the inner and outer ends respectively of the cylinder 70. When oil under pressure is fed through the pipe 84 into the inner end of the cylinder the pressure plate 68 will be projected rearwardly into the position shown in Fig. 3, and when oil under pressure is fed through the pipe 84 into the outer end of the cylinder the pressure plate will be retracted forwardly into the position shown in Fig. 2. A horizontally arranged torque rod 86 is journaled in the upper portion of the body above the cylinder 70 and is provided at its ends with arms 87 which are connected to the sides of the pressure plate 68 by links 88. The torque rod 86, with its arms 87 and links 88, prevents either end of the pressure plate 68 from moving faster than the other end and keeps the same in a vertical position parallel to the front wall 71 of the body at all times.

The oil used in operating the hydraulic cylinder 70 enters and leaves the pipes 84 and 85 through a diverting valve 89, to which the pipes 46 and 47 are also connected. This diverting valve contains a multiple-port plunger (not shown) which is connected by a rod 90 with an arm 91 on a rock shaft 92. The main control valve 49 is connected with the diverting valve 89 by means of two pipes 93 and 94. When the diverting valve 89 is in its closed-off position the pipe 46 will be connected with the pipe 93 and the pipe 47 will be connected with the pipe 94, whereas, when the shaft 92 is rocked to the left to open the diverting valve the pipes 46 and 47 connected with the main operating cylinder 37 will be shut off and the pipes 84 and 85 connected with the pressure plate cylinder 70 will be placed in communication respectively with the pipes 93 and 94. The plunger of the diverting valve 89 has but two positions, namely a closed-off position and a diverting position. In its closed-off position the oil will flow from the main control valve 49 to and from the main operating cylinder 37, and in its diverting position the cylinder 37 will be cut off and the oil will flow from the main control valve 49 to and from the pressure plate cylinder 70. The shaft 92 leads into a coupling box 95, where it is actuated by a shaft 96 which enters the box from the other side of the same and is connected with a hand lever 97.

To open the diverting valve 89 the hand lever 97 is swung to the left. A finger 98 is secured to the end of the shaft 96 within the control box 95, and when the shaft 96 is rocked to the left this finger will engage with a pin 99 on a cam 100, which cam is secured to the end of the shaft 92, thereby moving the rod 92 to the left and operating the diverting valve 89 to connect up the hydraulic cylinder 70 with the main control valve 49. The normally coupled rod sections 51 and 52 which extend between the main control valve 49 and the hand lever 50 pass through the box 95. When the compactor is not in use the rod section 51 will be coupled with the rod section 52 by means of a key 101 which is pivotally carried by the section 52 and fits between two spaced collars 102 on the section 51. This key, when in position between the collars, locks the two rod sections together so that when the section 52 is shifted axially by the hand lever 50, the section 51 leading to the main control valve 49 will be correspondingly shifted. When the compactor is being operated the hand lever 50 is locked in its neutral position to prevent it from being manipulated to operate the main control valve 49. This locking of the hand lever 50 is accomplished by the key 101. When the shaft 92 is rocked to the left to open the diverting valve the cam 100 which carries the pin 99 raises the key 101 into a position between two stationary blocks 103 on the inside of the box. The raising of the key 101 disconnects the shaft section 52 from the shaft section 51 and locks the shaft section 52 to prevent inadvertent movement of the hand lever 50 from its neutral position during the operation of the compactor. As soon as the shaft section 51 is released from the shaft section 52 the finger 98 comes into engagement with the left hand collar 102 on the shaft section 51 and moves the latter to the left, thereby moving the center plunger 58 in the main control valve 49 to the left and causing the oil under pressure to flow through the pipe 93 into the pipe 84 leading to the bottom of the pressure plate operating cylinder 70. The pressure plate 68 will thereupon move rearwardly to compress the garbage, rubbish or other material within the body 10.

When the piston 72 in the cylinder 70 reaches the end of its stroke, or else when the plate 68 has compressed the material as much as it can, the excess pressure thereby built up in the pipe 84 wil lact on the side plunger 59 in the valve 84 to reverse the latter and start the plate 68 moving in the opposite direction. When the piston 72 in the cylinder 70 reaches the other end of its travel the excess pressure built up in the line 85 will act on one end of the plunger in the diverting valve 89 through a suitably arranged by-pass (not shown) to move the plunger back into the closed position of the diverting valve, thereby bringing the compactor to rest in its retracted position. This return movement of the plunger in the diverting valve 89 will act through the rod 90 and arm 91 to rock the shaft 92 back to its starting position, and this movement of the shaft 92 will move the cam 100 out from under the key 101 and allow the key to drop back into position between the collars 102 on the rod section 51, thereby coupling the shaft sections 51 and 52 together again for either bucket elevating or body tilting operation. As the cam 100 on the shaft 92 is rocked back into its starting position a dog 104 on the cam will engage with a dog 105 on a pivoted lever 106 and will cause the lever 106 to engage with another cam 107 on the shaft section 51, thereby returning the center plunger 58 of the valve 49 to its neutral position.

Reviewing briefly the operation of the bucket, body and compactor, movement of the hand lever 50 to the left when the hand lever 55 is in its body locking position will cause the bucket to raise, automatically stop and dump its contents into the body, and return. After the bucket has been started on its upward travel no further attention to the mechanism is required, the bucket automatically reversing at the upper end of its travel and coming to a stop at the lower end of its travel, at which latter point the hand lever 50 will automatically return to its neutral position. To tilt up the body in order to dump the same, the hand lever 50 is first moved to the left to run the bucket up to the top of the body into an out-of-the-way position. As it reaches that position the hand lever 50 is swung into its neutral position and the hand lever 55 is operated to unlock the body from the chassis and lock the rack 41 against movement. The hand lever 50 is then moved to the right, causing the body to raise. When the body reaches its uppermost position the excess pressure on the side plunger 62 in the main control valve 49 will shift the center plunger 58 of the valve into neutral and return the hand lever 50 to its neutral position again. When it is desired to lower the body the hand lever 50 is moved to the left, and when the body reaches its lowermost position the block 65 will strike the arm 67 and move the hand lever 50, together with the center plunger 58 of the valve, back again into its neutral position. To operate the compactor the hand lever 50 is left in its neutral position and the hand lever 97 is moved to the left, whereupon the compactor will make a complete cycle of movement, returning automatically and coming to rest in its forwardly retracted position.

If desired, the compactor may be caused to operate automatically in connection with the operation of the bucket—as in Patent No. 2,124,624—the pressure plate 68 moving first rearwardly and then forwardly each time the bucket descends to its loading position in order to compress the load in the body after each bucketful has been deposited therein. This may be accomplished in any one of a number of different ways, as for instance by having the flow of oil to the hydraulic cylinder 70 for the compactor controlled by a separate four-way valve (not shown) connected with both ends of the cylinder and the pressure and discharge lines of the system, and by having this four-way valve actuated by stops on one of the chains for the bucket in such manner as to cause the oil under pressure to be fed to one end of the cylinder upon movement of the chain in one direction and to the other end of the cylinder upon movement of the chain in the opposite direction.

We claim:

1. In a self-loading vehicle, a body having an opening in the upper portion thereof, means for tilting the body to dump the contents of the same, a loading bucket, means for raising and lowering the bucket to and from the opening, a rack slidably mounted on the under side of the body, a hydraulic cylinder pivotally connected at one end to the vehicle beneath the body and having a piston rod which is pivotally connected at the other end to the rack, a power-transmitting means between the rack and the means for raising and lowering the bucket, and means for releasing the body from the vehicle and locking the rack against movement, whereby operation of the hydraulic cylinder will tilt up the body.

2. In a self-loading vehicle, a body having an opening in the upper portion thereof, means for tilting the body to dump the contents of the same, a loading bucket, means for raising and lowering the bucket to and from the opening, a pressure plate movably mounted in the body adjacent the opening for compacting the material in the body, hydraulic means for operating the bucket, hydraulic means for operating the pressure plate, and a diverting valve for directing the flow of oil under pressure to either of said hydraulic means.

3. In a self-loading vehicle, a body having an opening in the upper portion thereof, means for tilting the body to dump the contents of the same, a loading bucket, means for raising and lowering the bucket to and from the opening, a pressure plate movably mounted in the body adjacent the opening for compacting the material in the body, a single hydraulic cylinder for operating either the bucket or the body, another hydraulic cylinder for operating the pressure plate, a main valve for controlling the flow of oil under pressure into and out of either of said cylinders, and a diverting valve for changing the flow of oil from one cylinder to the other.

4. In a self-loading vehicle, a body having an opening in the upper portion thereof, means for tilting the body to dump the contents of the same, a loading bucket, means for raising and lowering the bucket to and from the opening, a pressure plate movably mounted in the body adjacent the opening for compacting the material in the body, a single hydraulic cylinder for operating either the bucket or the body, another hydraulic cylinder for operating the pressure plate, a main valve for controlling the flow of oil under pressure into and out of either of said cylinders, and a diverting valve for changing the flow of oil from one cylinder to the other, said main control valve including means for shutting off the flow of the oil under pressure upon an excess of pressure in the system occasioned by either stoppage of the bucket in being raised or lowered, stoppage of the body in being tilted, or stoppage of the pressure plate in being moved.

5. In a self-loading vehicle, a body which is pivotally supported at its rearward end and is provided with openings in the upper and rear portions thereof, means for tilting the body rearwardly to dump the contents of same through the opening in the rear portion of the body, a loading bucket, means for raising and lowering the bucket to and from the opening in the upper portion of the body, a pressure plate movably mounted in the body adjacent the opening in the upper portion of the same, said plate being movable toward the opening in the rear portion of the body, and means for moving the pressure plate toward said last mentioned opening when the body is in its rearwardly tilted position whereby to forcibly discharge the load in the body through said opening.

ELBERT C. LEACH.
HERBERT J. HILLBORN.